(12) United States Patent
Migault et al.

(10) Patent No.: US 12,413,597 B2
(45) Date of Patent: Sep. 9, 2025

(54) DOMAIN NAME SYSTEM SECURITY EXTENSION (DNSSEC) FOR CONTAINER SIGNATURE MANAGEMENT (71) Applicant: Telefonaktiebolaget LM Ericsson (publ), Stockholm (SE)

(72) Inventors: Daniel Migault, Montreal (CA); Stere Preda, Longueuil (CA); Thomas Ingemarsson, Saltsjö-Boo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 254 days.

(21) Appl. No.: 18/044,630

(22) PCT Filed: Sep. 14, 2021

(86) PCT No.: PCT/IB2021/058384
§ 371 (c)(1),
(2) Date: Mar. 9, 2023

(87) PCT Pub. No.: WO2022/054035
PCT Pub. Date: Mar. 17, 2022

(65) Prior Publication Data
US 2023/0370474 A1    Nov. 16, 2023

Related U.S. Application Data

(60) Provisional application No. 63/077,926, filed on Sep. 14, 2020.

(51) Int. Cl.
*H04L 9/40*        (2022.01)
*H04L 9/32*        (2006.01)
*H04L 61/4511*     (2022.01)

(52) U.S. Cl.
CPC .......... *H04L 63/123* (2013.01); *H04L 9/3247* (2013.01); *H04L 61/4511* (2022.05)

(58) Field of Classification Search
CPC ... H04L 63/123; H04L 61/4511; H04L 9/3247
See application file for complete search history.

(56) References Cited

U.S. PATENT DOCUMENTS 8,407,471 B1 * 3/2013 Sobel ................. H04L 61/4511
                                                          713/168
8,495,717 B1 * 7/2013 Beacham ................ G06F 21/62
                                                           380/279

(Continued)

OTHER PUBLICATIONS

International Search Report and Written Opinion dated Nov. 19, 2021 issued in PCT Application No. PCT/IB2021/058384, filed Sep. 14, 2021, consisting of 13 pages.

(Continued)

*Primary Examiner* — Ghodrat Jamshidi
(74) *Attorney, Agent, or Firm* — Weisberg I.P. Law, P.A.

(57) ABSTRACT

A method, system and apparatus are disclosed. According to one or more embodiments, a verifier is provided. The verifier includes processing circuitry configured to obtain a hash algorithm and a fully qualified domain name, FQDN, associated with a virtual network function, VNF, image, determine an identifier for the VNF image based at least on the hash algorithm and the FQDN, perform domain name system security extensions, DNSSEC, resolution of the determined identifier for the VNF image at least in part by requesting at least one attribute of the VNF image using the determined identifier for the VNF image and validating a response associated with the request, and perform validation of the VNF image in response to successful DNSSEC resolution.

30 Claims, 5 Drawing Sheets

(56) References Cited

U.S. PATENT DOCUMENTS

| | | | | |
|---|---|---|---|---|
| 9,338,182 | B2* | 5/2016 | Devarapalli | H04L 67/1001 |
| 11,271,948 | B2* | 3/2022 | Hermoni | H04L 41/0823 |
| 2003/0163737 | A1* | 8/2003 | Roskind | H04L 9/3236 726/6 |
| 2012/0155646 | A1* | 6/2012 | Seshadri | H04L 9/3247 380/278 |
| 2016/0021055 | A1* | 1/2016 | Krzywonos | H04L 61/301 709/245 |
| 2016/0337329 | A1* | 11/2016 | Sood | G06F 21/10 |
| 2018/0337931 | A1* | 11/2018 | Hermoni | H04L 41/0823 |
| 2019/0238505 | A1* | 8/2019 | Richards | H04L 61/10 |
| 2020/0210589 | A1* | 7/2020 | Sood | H04L 9/30 |

OTHER PUBLICATIONS

ETSI GS NFV-SEC 021 V2.6.1 (Jun. 2019); Network Functions Virtualisation (NFV) Release 2; Security; VNF Package Security Specification, consisting of 11 pages.
OpenStack Documentation; Support VNF Package (TOSCA CSAR) in Tacker; Aug. 27, 2019, consisting of 14 pages.
OpenStack Documentation; Feature Support Matrix; Dec. 20, 2018, consisting of 20 pages.
OASIS; TOSCA Simple Profile in YAML Version 12; OASIS Standard; Jan. 17, 2019, consisting of 315 pages.
ETSI GS NFV-SOL 004 V2.5.1 (Sep. 2018); Network Functions Virtualisation (NFV) Release 2; Protocols and Data Models; VNF Package specification, consisting of 21 pages.
Aaron Weitekamp; Container Image Signing; Red Hat Blog; Jul. 22, 2016, consisting of 13 pages.
Antonio Murdaca; Secure Your Kubernetes Production Cluster; Jan. 18, 2018, consisting of 10 pages.
Docker Documentation; Content Trust in Docker; May 12, 2020, consisting of 13 pages.
Microsoft Docs; Azure Container Registry; Sep. 6, 2019, consisting of 11 pages.
Debian Wiki; All About Secure Apt; Aug. 13, 2019, consisting of 20 pages.
Joe Damata; HOWTO: GPG sign and Verify Deb Packages and APT Repositories; Oct. 28, 2014, consisting of 17 pages.
Packagecloud:Blog; Attacks Against GPG Signed APT Repositories; Feb. 21, 2018, consisting of 23 pages.
International Preliminary Report on Patentability dated Mar. 23, 2023 issued in PCT Application No. PCT/IB2021/058384, filed Sep. 14, 2021, consisting of 9 pages.
Vbatts, Open Container Initiative Runtime Specification; Specification Version 1.0.2; Mar. 27, 2020, consisting of 58 pages.
OpenStack, Image Signature Verification; Aug. 21, 2019, consisting of 5 pages.
OpenStack, Instructions for Mitaka Image Signature Verification Feature; Apr. 2016, consisting of 17 pages.

* cited by examiner

DOMAIN NAME SYSTEM SECURITY EXTENSION (DNSSEC) FOR CONTAINER SIGNATURE MANAGEMENT

CROSS-REFERENCE TO RELATED APPLICATIONS

This application is a Submission Under 35 U.S.C. § 371 for U.S. National Stage Patent Application of International Application No.: PCT/IB2021/058384, filed Sep. 14, 2021 entitled "DOMAIN NAME SYSTEM SECURITY EXTENSION (DNSSEC) FOR CONTAINER SIGNATURE MANAGEMENT," which claims priority to U. S. Provisional Application No.: 63/077926, filed Sep. 14, 2020, entitled "DNSSEC FOR CONTAINER SIGNATURE MANAGEMENT," the entireties of both of which are incorporated herein by reference.

FIELD

The present disclosure relates to wireless communications, and in particular, to domain name system security extension, DNSSEC, based signature management.

BACKGROUND

When a vendor delivers a virtual network function (VNF) to an operator such as a network operator, the VNF is signed by the vendor. The network operator is expected to verify the signature in order to check that the VNF has not been altered. Once the signature has been checked/verified, the VNF is entered (on-boarded) into the operator's system.

In some systems (e.g., Openstack, Kubernettes, etc.) the responsibility of having the software not being corrupted is left to the network operator and the system operating the VNF. In some cases, the VNF is stored into a repository. When a VNF is instantiated, the system takes the VNF from the repository and instantiates it. In order to help ensure that the VNF stored into the repository is the same as the VNF that is instantiated, each system has its own verification mechanism based on the verification of a signature. Describing this verification mechanism as a signature verification involves:
the generation of the signatures;
the infrastructure to store the signatures;
the necessary protocols to retrieve the signature for validation; and
the verification process which includes a procedure, the parsing of a specific format and finally the cryptography verification.

As a result, verification of the integrity of a VNF may be functionality that is inherent to the specific system (e.g., specific to Openstack, Kubernetes, etc.) and as such is proprietary to the specific system that is implemented.

Further, in most distribution/management systems, signature verification may be characterized by the security keys being managed by the distribution system—as opposed to a third party such as the software vendor. In addition, the signature is not part of the distributed data but more of an add-on. One reason for such a split could be that operation and software vendors have different roles and in general it can be difficult for a platform to know the trusted vendors. For example, if a standard K8s operator instantiates a first vendor VNF with signature verification, the K8s operator may need to configure the vendor root certificate as a trusted key. To some extent, this could lock the platform to the vendor VNF.

European Telecommunications Standards Institute (ETSI) Group Specification (GS) Network Function Virtualization (NFV) SEC 021 [ETSI GS NFV-SEC 021] requires that each artefact/artifact of the VNF Package be authenticated and that the vendor is using cryptographic message syntax (CMS) request for comments (RFC) 5652 signature format as per ETSI NFV-SOL 004. ETSI GS NFV-SEC 021 also requires that each container be verified at the instantiation. The ETSI specification mentions the VNF provider (e.g., vendor).

The vendor as a VNF provider shares a VNF Package (VNFP) having an unordered set of open container initiative (OCI) image containers artifacts (link(s)). The format and associated signature of the VNFP is defined in ETSI [SOL004] which extends the OASIS Cloud Service Archive (CSAR).

Upon receiving the VNFP, the operator (i.e., ISP or service provider) checks the signature and proceeds to the onboarding phase, which corresponds to making the image available to its infrastructure by storing the OCI images into a container image repository (CIR).

ETSI may require that before instantiating a VNF, the system must check the signature provided by the vendor. This differs from the existing model as:
1. the signature is not generated by the system or the operator but by a third party;
2. the system may need to integrate a service that stores a third party signature with a standard format or the third party (Vendor) needs to adapt the signature to each platform;
3. the system may need a provisioning/interface system to enable third party (vendor) to provide their signature;
4. the verifier may need a standard protocol to retrieve the signature associated to a VNF that can be integrated to all platforms or a specific procedure needs to be designed for each platform; and
5. the verifier may need to implement the signature validation. Note that such implementation might require OS, or even hardware implementation.

As such, the deployment and validation of signatures remain complex as different systems may have different formats and/or procedures for such signatures.

SUMMARY

Some embodiments advantageously provide methods, systems, and apparatuses for domain name system security extensions, DNSSEC, based signature management.

One or more embodiments described herein describes how to use DNSSEC to validate a signature provided by a third party. In one or more embodiments, the third party may designate a party that is not the operator such as the vendor, but it could be any other party. In particular, in one or more embodiments, one or more properties associated with a standard signature format CMS fulfilled by DNSSEC as described herein.

The teachings described herein provide one or more of the following advantages:
DNSSEC validation is standardized and maintained by an active community with multiple open source software. As such, the developments associated to a verifier will come at almost no cost.
DNS is a scalable system with a lot of operational experience in terms of provisioning and management. As a result, integration to any system may occur at almost no cost.

Standardization of a solution common to all systems (or development of a system specific solution) may occur at no cost as the solution may already be standardized.

To simplify the deployment of a DNSSEC based signature, a check/verification may be limited to development and maintenance to:

dig+dnssec <container image>.vendor.com TXT

Further, the verification may be an ETSI requirement that does not meet the requirements of the community developing the Kubernetes platform, for example. As a result, vendors are likely to maintain the code responsible for validation and as minimizing the maintenance effort/requirements as described herein helps implementation.

According to one aspect of the present disclosure, a verifier is provided. The verifier includes processing circuitry configured to: obtain a hash algorithm and a fully qualified domain name, FQDN, associated with a virtual network function, VNF, image, determine an identifier for the VNF image based at least on the hash algorithm and the FQDN, perform domain name system security extensions, DNSSEC, resolution of the determined identifier for the VNF image at least in part by requesting at least one attribute of the VNF image using the determined identifier for the VNF image and validating a response associated with the request, and perform validation of the VNF image in response to successful DNSSEC resolution.

According to one or more embodiments of this aspect, the DNSSEC resolution is successful based at least on the at least one requested attribute of the VNF image being received and the response associated with the request being validated where the DNSSEC resolution is unsuccessful based at least on a proof of non-existence being received in response to the request. According to one or more embodiments of this aspect, the processing circuitry is further configured to receive a manifest including the VNF image where the performing of validation of the VNF image includes determining at least one attribute of the VNF image based at least on the manifest, and comparing the determined at least one attribute of the VNF image to the requested at least one attribute of the VNF image.

According to one or more embodiments of this aspect, the at least one attribute includes a content type and a hash of the VNF image. According to one or more embodiments of this aspect, the processing circuitry is further configured to instantiate the VNF image based at least on successful validation of the VNF image. According to one or more embodiments of this aspect, the response includes a DNSSEC signature where the processing circuitry configured to validate the DNSSEC signature at least in part by checking a chain of trust up to a root zone.

According to one or more embodiments of this aspect, the obtaining includes receiving a manifest and extracting at least one of the hash algorithm and the FQDN. According to one or more embodiments of this aspect, the obtaining is based on a pre-configuration of the hash algorithm and the FQDN for performing the DNSSEC resolution and the validation of the VNF image.

According to another aspect of the present disclosure, a signer is provided. The signer includes processing circuitry configured to obtain a hash algorithm and a fully qualified domain name, FQDN, associated with a virtual network function, VNF, image, determine an identifier for the VNF image based at least on the hash algorithm and the FQDN, determine at least one attribute of the VNF image, store the identifier for the VNF image and the at least one attribute of the VNF image, receive a request for at least one attribute of the VNF image for validation where the request is based on the identifier for the VNF image, and respond to the request for the at least one attribute of the VNF image where the response is part of a domain name system security extensions, DNSSEC, resolution of the identifier of the VNF image.

According to one or more embodiments of this aspect, the response includes one of: the at least one requested attribute of the VNF image, and an indication of a proof of non-existence. According to one or more embodiments of this aspect, the storing includes inserting the identifier for the VNF and the at least one attribute of the VNF image in a zone where the processing circuitry being further configured to sign the zone with a zone signing key to generate at least one DNSSEC signature, where a delegation of the zone is provided by DNSSEC until a root zone, and where the root zone is a trusted zone from which a chain of trust is built. According to one or more embodiments of this aspect, the response includes the DNSSEC signature.

According to one or more embodiments of this aspect, the at least one attribute of the VNF image includes a content type and a hash of the VNF image. According to one or more embodiments of this aspect, the obtaining includes receiving a manifest and extracting at least one of the hash algorithm and the FQDN. According to one or more embodiments of this aspect, the obtaining is based on a pre-configuration of the hash algorithm and the FQDN for performing the DNSSEC resolution and the validation of the VNF image.

According to one or more embodiments, a method implemented by a verifier is provided. A hash algorithm and a fully qualified domain name, FQDN, associated with a virtual network function, VNF, image are obtained. An identifier for the VNF image is determined based at least on the hash algorithm and the FQDN. Domain name system security extensions, DNSSEC, resolution of the determined identifier for the VNF image is performed at least in part by requesting at least one attribute of the VNF image using the determined identifier for the VNF image and validating a response associated with the request. Validation of the VNF image is performed in response to successful DNSSEC resolution.

According to one or more embodiments of this aspect, the DNSSEC resolution is successful based at least on the at least one requested attribute of the VNF image being received and the response associated with the request being validated where the DNSSEC resolution is unsuccessful based at least on a proof of non-existence being received in response to the request. According to one or more embodiments of this aspect, a manifest including the VNF image is received where the performing of validation of the VNF image includes determining at least one attribute of the VNF image based at least on the manifest, and comparing the determined at least one attribute of the VNF image to the requested at least one attribute of the VNF image. According to one or more embodiments of this aspect, the at least one attribute includes a content type and a hash of the VNF image. According to one or more embodiments of this aspect, the VNF image is instantiated based at least on successful validation of the VNF image. According to one or more embodiments of this aspect, the response includes a DNSSEC signature where the processing circuitry configured to validate the DNSSEC signature at least in part by checking a chain of trust up to a root zone. According to one or more embodiments of this aspect, the obtaining includes receiving a manifest and extracting at least one of the hash algorithm and the FQDN. According to one or more embodiments of this aspect, the obtaining is based on a pre-configuration of the hash algorithm and the FQDN for performing the DNSSEC resolution and the validation of the VNF image.

According to another aspect of the present disclosure, a method implemented by a signer is provided. A hash algorithm and a fully qualified domain name, FQDN, associated with a virtual network function, VNF, image are obtained. An identifier for the VNF image is determined based at least on the hash algorithm and the FQDN. At least one attribute of the VNF image is determined. The identifier for the VNF image and the at least one attribute of the VNF image are stored. A request for at least one attribute of the VNF image for validation is received. The request is based on the identifier for the VNF image. The request for the at least one attribute of the VNF image is responded to where the response is part of a domain name system security extensions, DNSSEC, resolution of the identifier of the VNF image.

According to one or more embodiments of this aspect, the response includes one of: the at least one requested attribute of the VNF image, and an indication of a proof of non-existence. According to one or more embodiments of this aspect, the storing includes inserting the identifier for the VNF and the at least one attribute of the VNF image in a zone where the zone is signed with a zone signing key to generate at least one DNSSEC signature, where a delegation of the zone is provided by DNSSEC until a root zone, where the root zone is a trusted zone from which a chain of trust is built. According to one or more embodiments of this aspect, the response includes the DNSSEC signature.

According to one or more embodiments of this aspect, the at least one attribute of the VNF image includes a content type and a hash of the VNF image. According to one or more embodiments of this aspect, the obtaining includes receiving a manifest and extracting at least one of the hash algorithm and the FQDN. According to one or more embodiments of this aspect, the obtaining is based on a pre-configuration of the hash algorithm and the FQDN for performing the DNSSEC resolution and the validation of the VNF image.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to domain name system security extensions, DNSSEC, based signature management. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, virtual network function (VNF), VNF image and VNF object may be used interchangeably.

The term "network node" may correspond to any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node. The signer and/or verifier functionality may be a respective network node.

Note further, that functions described herein as being performed by a signer or a verifier may be distributed over a plurality of nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide domain name system security extensions, DNSSEC, based signature management.

Figure 1:
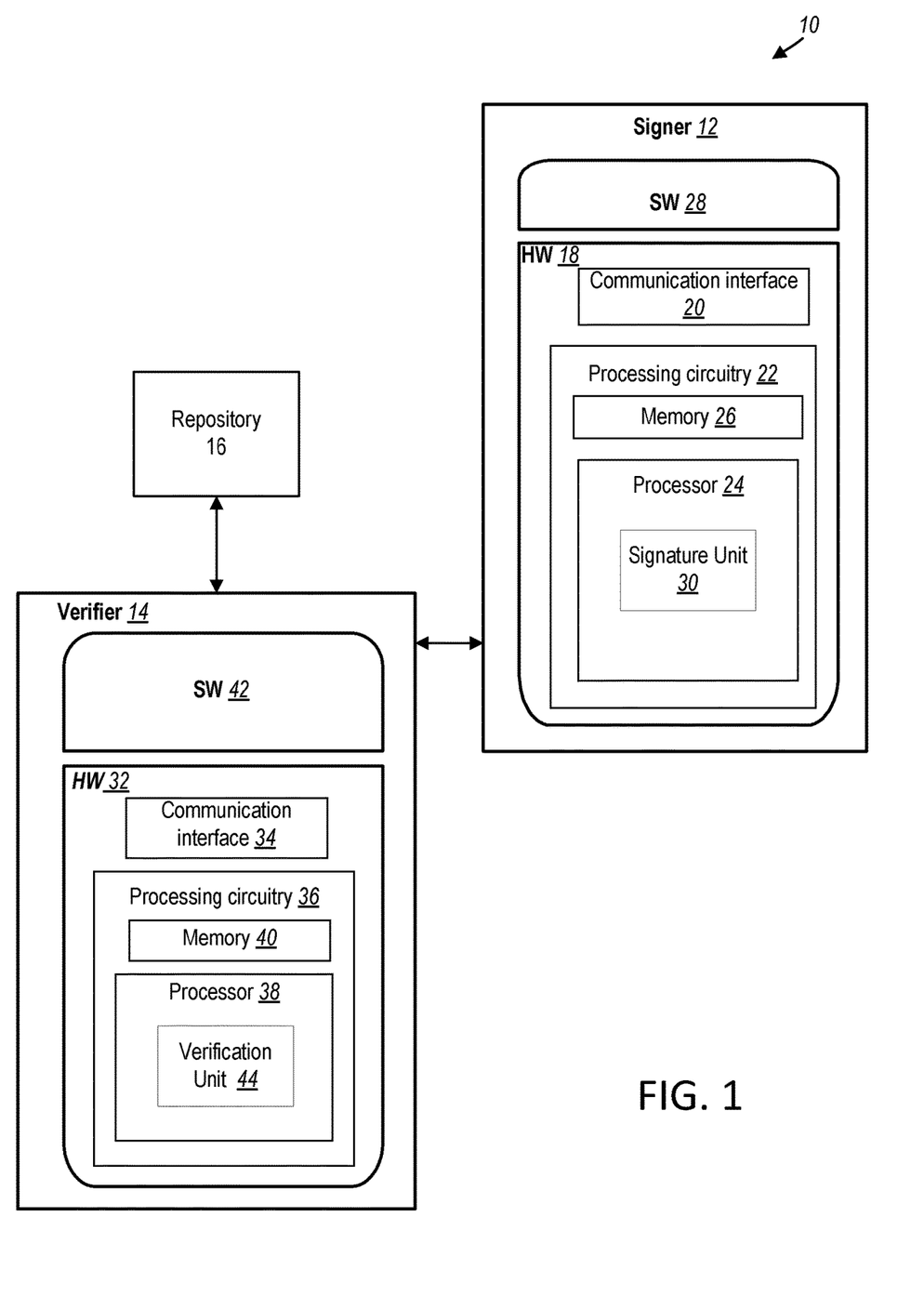
FIG. 1 is a schematic diagram of an example architecture illustrating a system according to the principles in the present disclosure.

Referring now to the drawing figures, in which like elements are referred to by like reference numerals, there is shown in FIG. 1 a schematic diagram of a system 10, according to one or more embodiments, which comprises a signer 12 in communication with a verifier 14 via one or more communication paths. In one or more embodiments, signer 12 and/or verifier 14 maybe respective nodes in a network. In one or more embodiments, the signer 12 may be a vendor, vendor system, vendor device, etc., while the verifier 14 may be an operator such as a network or system operator that is different from the vendor. Verifier 14 may be in communication with one or more repositories 16 (collectively referred to as repository 16) for storing and retrieving data, files, etc., such as a VNFP, signature, etc., as described herein.

Example implementations, in accordance with one or more embodiments, of the signer 12 and verifier 14 are described below. In system 10, signer 12 is provided where signer 12 includes hardware 18 enabling it to communicate with the verifier 14 among for performing other functions described herein. The hardware 18 may include a communication interface 20 for communicating with verifier 14 via one or more communication paths.

In the embodiments shown, the hardware 18 of the signer 12 further includes processing circuitry 22. The processing circuitry 22 may include a processor 24 and a memory 26. In particular, in addition to or instead of a processor, such as a central processing unit, and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 24 may be configured to access (e.g., write to and/or read from) the memory 26, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the signer 12 further has software 28 stored internally in, for example, memory 26, or stored in external memory (e.g., database, storage array, network storage device, etc.) accessible by the signer 12 via an external connection. The software 28 may be executable by the processing circuitry 22. The processing circuitry 22 may be configured to control any of the methods and/or processes described herein and/or to cause such methods, and/or processes to be performed, e.g., by signer 12. Processor 24 corresponds to one or more processors 24 for performing signer 12 functions described herein. The memory 26 is configured to store data, programmatic software code and/or other information described herein. In some embodiments, the software 28 may include instructions that, when executed by the processor 24 and/or processing circuitry 22, causes the processor 24 and/or processing circuitry 22 to perform the processes described herein with respect to signer 12. For example, processing circuitry 22 of the signer 12 may include signature unit 30 configured to perform one or more signer 12 functions as described herein such as with respect to VNF, VNFP, signature, etc., generation and/or communication for verification.

The system 10 further includes the verifier 14 already referred to. The verifier 14 may have communication interface 34 that is configured to communicate with signer 12 and/or repository 16. The hardware 32 further includes processing circuitry 36. The processing circuitry 36 may include a processor 38 and memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the verifier may further comprise software 42, which is stored in, for example, memory 40, or stored in external memory (e.g., database/repository 16, storage array, network storage device, etc.) accessible by verifier 14. The software 42 may be executable by the processing circuitry 36. The processing circuitry 36 may be configured to control any of the methods and/or processes described herein and/or to cause such methods, and/or processes to be performed, e.g., verifier 14. The processor 38 corresponds to one or more processors 38 for performing verifier 14 functions described herein. The verifier 14 includes memory 40 that is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to verifier 14. For example, the processing circuitry 36 of the verifier 14 may include a verification unit 44 configured to perform one or more verifier 14 functions as described herein such as with respect to verification of a VNF and/or VNFP.

Although FIG. 1 show various "units" such as signature unit 30 and verification unit 44 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
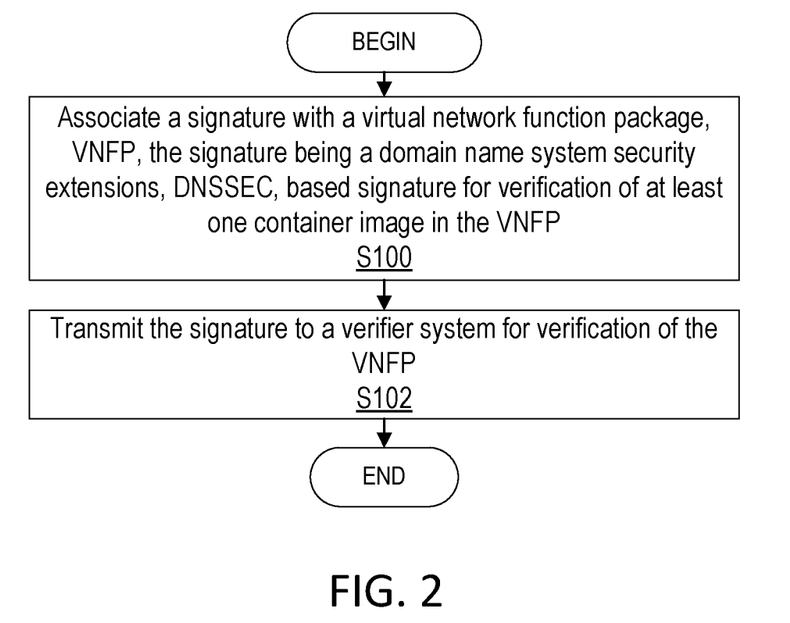
FIG. 2 is a flowchart of an example process in a signer according to some embodiments of the present disclosure.

FIG. 2 is a flowchart of an example process in a signer 12 according to some embodiments of the present disclosure. One or more Blocks and/or functions performed by signer 12 may be performed by one or more elements of signer 12 such as by signature unit 30 in processing circuitry 22, processor 24, communication interface 20, etc. In one or more embodiments, signer 12 is configured to associate (Block S100) a signature with a virtual network function package, VNFP, were the signature is a domain name system security extensions, DNSSEC, based signature for verification of at least one container image in the VNFP, as described herein. In one or more embodiments, signer 12 is configured to transmit (Block S102) the signature to a verifier system for verification of the VNFP, as described herein.

According to one or more embodiments, the processing circuitry 22 is further configured to extract a hash algorithm and associated hash value of a VNF image, build a fully qualified domain name, FQDN, that uniquely determines the VNF, build a signed attribute file, and sign a zone with a zone signing key to generate signatures associated with text, TXT, domain name system record set, Rrset. According to one or more embodiments, the signature corresponds to a derivable fully qualified domain name, FQDN, that is used as a unique identifier. According to one or more embodiments, the signature is based on a signing a manifest using a private key.

Figure 3:
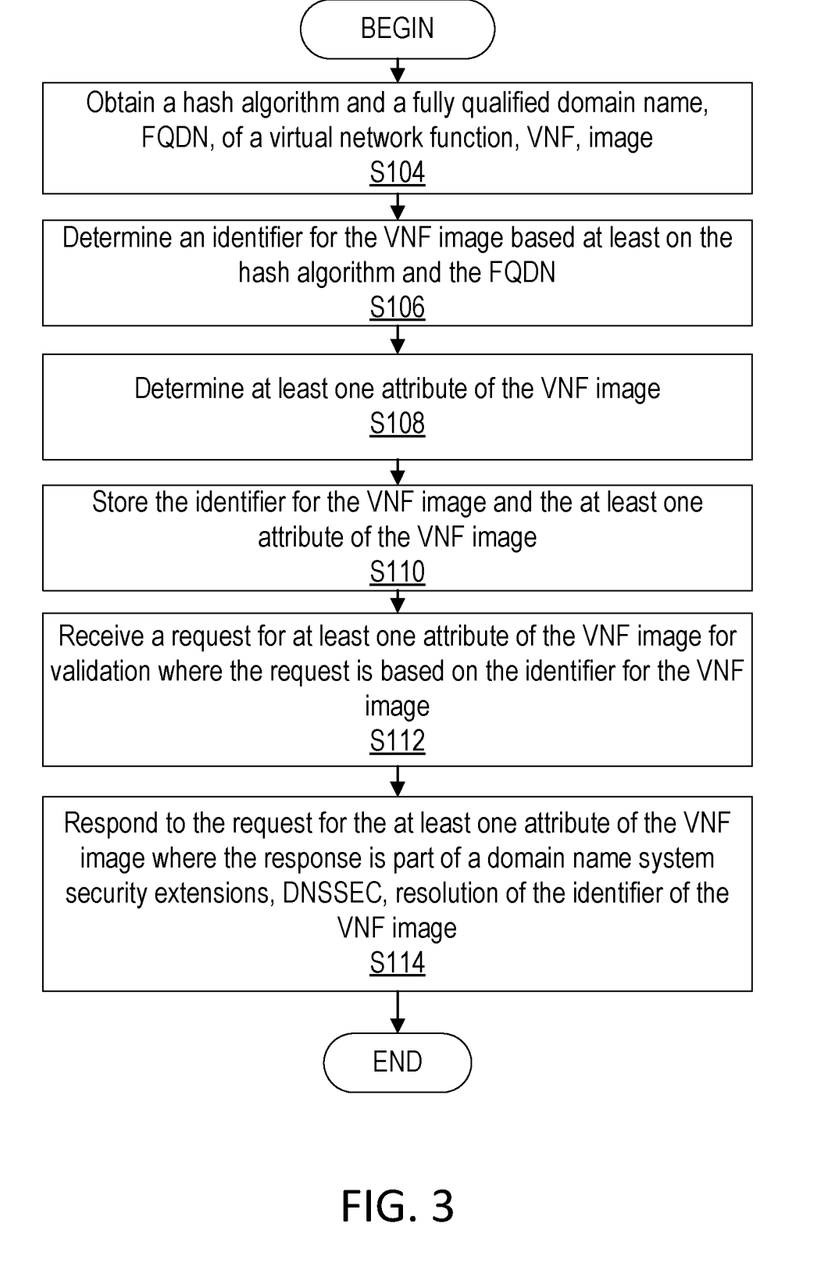
FIG. 3 is a flowchart of another example process in a signer according to some embodiments of the present disclosure.

FIG. 3 is a flowchart of another example process in a signer 12 according to some embodiments of the present disclosure. One or more Blocks and/or functions performed by signer 12 may be performed by one or more elements of signer 12 such as by signature unit 30 in processing circuitry 22, processor 24, communication interface 20, etc. In one or more embodiments, signer 12 is configured to obtain (Block S104) a hash algorithm and a fully qualified domain name, FQDN, associated with a virtual network function, VNF, image, as described herein. Signer 12 is configured to determine (Block S106) an identifier for the VNF image based at least on the hash algorithm and the FQDN, as described herein. Signer 12 is configured to determine (Block S108) at least one attribute of the VNF image, as described herein. Signer 12 is configured to store (Block S110) the identifier for the VNF image and the at least one attribute of the VNF image, as described herein.

Signer 12 is configured to receive (Block S112) a request for at least one attribute of the VNF image for validation where the request is based on the identifier for the VNF image, as described herein. Signer 12 is configured to respond (Block S114) to the request for the at least one attribute of the VNF image where the response is part of a domain name system security extensions, DNSSEC, resolution of the identifier of the VNF image.

According to one or more embodiments, the response includes one of the at least one requested attribute of the VNF image, and an indication of a proof of non-existence. According to one or more embodiments, the storing includes inserting the identifier for the VNF and the at least one attribute of the VNF image in a zone where the processing circuitry 22 is further configured to sign the zone with a zone signing key to generate at least one DNSSEC signature, where a delegation of the zone is provided by DNSSEC until a root zone, and where the root zone being a trusted zone from which a chain of trust is built. According to one or more embodiments, the response includes the DNSSEC signature.

According to one or more embodiments, the at least one attribute of the VNF image includes a content type and a hash of the VNF image. According to one or more embodiments, the obtaining includes receiving a manifest and extracting at least one of the hash algorithm and the FQDN. According to one or more embodiments, the obtaining is based on a pre-configuration of the hash algorithm and the FQDN for performing the DNSSEC resolution and the validation of the VNF image.

Figure 4:
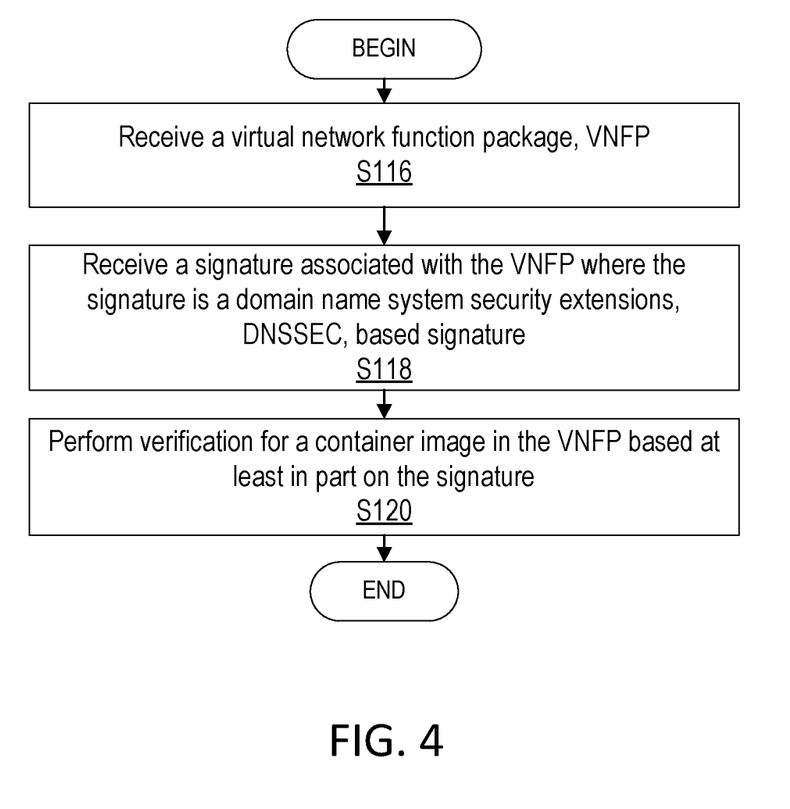
FIG. 4 is a flowchart of an example process in a verifier according to some embodiments of the present disclosure.

FIG. 4 is a flowchart of an example process in a verifier 14 according to some embodiments of the present disclosure. One or more Blocks and/or functions performed by verifier 14 may be performed by one or more elements of verifier 14 such as by verification unit 44 in processing circuitry 36, processor 38, communication interface 34, etc. In one or more embodiments, verifier 14 is configured to receive (Block S116) a virtual network function package, VNFP, as described herein. In one or more embodiments, verifier 14 is configured to receive (Block S118) a signature associated with the VNFP, the signature being a domain name system security extensions, DNSSEC, based signature, as described herein. In one or more embodiments, verifier 14 is configured to perform (Block S120) verification for a container image in the VNFP based at least in part on the signature, as described herein.

According to one or more embodiments, the verification includes: extracting a hash algorithm and associated hash value of a VNF image, building a fully qualified domain name, FQDN, that uniquely determines the VNF, performing DNSSEC validation of the hash value of the VNF image, and if the DNSSEC validation is successful: read a first digest value from a message, generate a second digest value based on the VNF image, where the VNF is verified if the first digest value matches the second digest value. According to one or more embodiments, the signature corresponds to a derivable fully qualified domain name, FQDN, that is used as a unique identifier. According to one or more embodiments, the signature is based on a manifest being signed using a private key.

Figure 5:
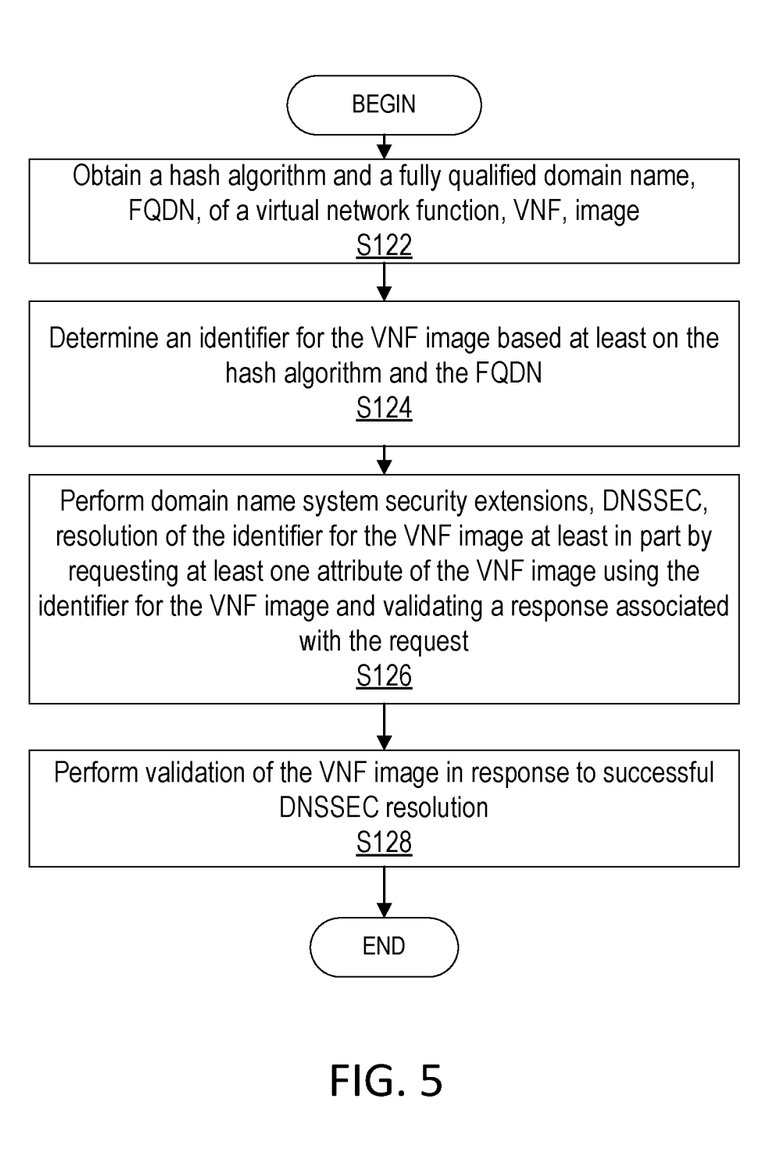
FIG. 5 is a flowchart of another example process in a verifier according to some embodiments of the present disclosure.

FIG. 5 is a flowchart of another example process in a verifier 14 according to some embodiments of the present disclosure. One or more Blocks and/or functions performed by verifier 14 may be performed by one or more elements of verifier 14 such as by verification unit 44 in processing circuitry 36, processor 38, communication interface 34, etc. In one or more embodiments, verifier 14 is configured to obtain (Block S122) a hash algorithm and a fully qualified domain name, FQDN, associated with a virtual network function, VNF, image, as described herein. Verifier 14 is configured to determine (Block S124) an identifier for the VNF image based at least on the hash algorithm and the FQDN, as described herein.

Verifier 14 is configured to perform (Block S126) domain name system security extensions, DNSSEC, resolution of the determined identifier for the VNF image at least in part by requesting at least one attribute of the VNF image using the determined identifier for the VNF image and validating a response associated with the request, as described herein. Verifier 14 is configured to perform (Block S128) validation of the VNF image in response to successful DNSSEC resolution, as described herein.

According to one or more embodiments, the DNSSEC resolution is successful based at least on the at least one requested attribute of the VNF image is received and the response associated with the request being validated, where the DNSSEC resolution is unsuccessful based at least on a proof of non-existence being received in response to the request. According to one or more embodiments, the processing circuitry 36 is further configured to receive a manifest including the VNF image where the performing of validation of the VNF image includes determining at least one attribute of the VNF image based at least on the manifest and comparing the determined at least one attribute of the VNF image to the requested at least one attribute of the VNF image. According to one or more embodiments, the at least one attribute includes a content type and a hash of the VNF image.

According to one or more embodiments, the processing circuitry 36 is further configured to instantiate the VNF image based at least on successful validation of the VNF image. According to one or more embodiments, the response includes a DNSSEC signature where the processing circuitry 36 configured to validate the DNSSEC signature at least in part by checking a chain of trust up to a root zone. According to one or more embodiments, the obtaining includes receiving a manifest and extracting at least one of the hash algorithm and the FQDN. According to one or more embodiments, the obtaining is based on a pre-configuration of the hash algorithm and the FQDN for performing the DNS SEC resolution and the validation of the VNF image.

Having generally described arrangements for domain name system security extensions, DNSSEC, based signature management, details for these arrangements, functions and processes are provided as follows, and which may be implemented by the signer 12 and/or verifier 14. In particular, one or more signer 12 functions described below may be implemented by one or more of processing circuitry 22, processor 24, signature unit 30, etc. One or more verifier 14 functions described below may be implemented by one or more of processing circuitry 36, processor 38, verification unit 44, etc.

Embodiments provide domain name system security extensions, DNSSEC, based signature management.

Leveraging the DNS Infrastructure to Perform Validation Equivalent to CMS

The CMS signature as an example, is described below. The CMS signature contains:
  the chain of trust that is used to validate the signature;
  signed attributes:
    the digest of the signed content;
    content type;
    signing time;
  the signature algorithms;
  the signature.

In one or more embodiments, the following command is used to generate the CMS signature:
  openssl cms -sign -binary -in MANIFEST -inkey $KEY -out $SIGNATURE -signer $SIGNER -outform der -certfile $CA
Where
  MANIFEST is the file object to sign;
  KEY/SIGNER is the private key used to generate the signature;
  CA is the chain of trust that makes SIGNER trusted;
  SIGNATURE the resulting signature.

More information may be found in man openssl cms. The generation of the signature is described below. The validation of the CMS signature is performed as follows:
  openssl cms -verify -binary -in $SIGNATURE -content $MANIFEST -CAfile $TA -inform der
Where:
  SIGNATURE represents the Signature;
  MANIFEST the object being signed;
  TA the trust anchors of the verifier.

Therefore, one or more embodiments described herein advantageously leverage DNSSEC to provide the same or similar properties, thereby leveraging advantages provided by the DNS infrastructure and DNS protocol that have no equivalent in CMS.

Signer 12

One or more signer 12 functions described below may be performed by one or more of processing circuitry 22, processor 24, signature unit 30, etc.

Given the MANIFEST and KEY/SIGNER, the CA signer 12 may be expected to proceed as described below.

In the context according to the teachings of the disclosure, KEY designates a public KEY and the corresponding public part designates a public key that is used to sign a DNS zone. This key also designates as Zone Signing Key (ZSK).

Steps
1. Read MANIFEST and extract the hash algorithm (h_algo) and the associated hash value of the VNF image (h_image). In one or more embodiments, h_algo is SHA256 but other algorithms may be used.
2. Read the domain name associated to the ZSK (which in one or more embodiments corresponds to <rand>.ericsson.net or <rand>.vendor.net where rand is a base64 32 byte random. In one or more embodiments, this number may only be generated at the creation of the zone to prevent a third party user to access the zone.
3. Build the FQDN that will uniquely determine the VNF. To fit the DNS specification, the FQDN may need to be smaller than 255 bytes with each label being smaller than 63 bytes. The means that image_h may be smaller than 504 bits. The use of SHA256 with 32 bytes does not goes over the limit, but SHA512 with 64 bytes may reach this limit if the exact hash is needed. As a result, the FQDN may be built as follows:
   a) Convert the h_image (or object) into a text compatible format such as Base64. h_image_base64.
   b) Determine the length of the hostname given the hash algorithm. The hash function may have a specific length. h_algo.len that may be associated with length may be known to the verifier. The length of the hostname is set to:
      ■ hostname_len=min(h_algo.len, 63)
   c) Take the hostname_len first bytes of h_image_base64
   d) Append the domain name <rand>.ericsson.net. The resulting identifier of the VNF is:
      ■ h_image_base64.<rand>.ericsson.net.
4. Build a signed attribute JSON file. The JSON format is adopted for convenience as other formats may be used. The signed attributes can be extended at the disposal of the signer 12/verifier 14. In the case of a CMS signature, the following signed data are generally considered:
   ■ the digest of the signed content;
   ■ content type;
   ■ signing time.
signedAttrs:
object: contentType (1.2.840.113549.1.9.3)
set:
  OBJECT:pkcs7-data (1.2.840.113549.1.7.1)
object: signingTime (1.2.840.113549.1.9.5)
set:
  UTCTIME:Apr 3 14:02:51 2020 GMT
object: messageDigest (1.2.840.113549.1.9.4)
set:
  OCTET STRING:
  0000 —5a 48 78 f3 30 97 30 9e-66 d7 ce 9a 52 ZHx.0.0f . . . R
  000d—a3 79 91 6b c0 a7 1e 99-9c 9c 4d 34 cb .y.k . . . M4.
  001a—d0 92 13 37 35 14 . . . 75.
object: S/MIME Capabilities (1.2.840.113549.1.9.15)
set:
  SEQUENCE:
0:d=0 hl=21=106 cons: SEQUENCE
[ . . . ]

86:d=2 h1=21=5 prim: OBJECT:des-cbc
93:d=1 h1=21=13 cons: SEQUENCE
95:d=2 h1=21=8 prim: OBJECT:rc2-cbc
105:d=2 h1=21=1 prim: INTEGER:28

In one or more embodiments, the signing time may be an optional argument that must not be provided as it is provided by DNSSEC RRSIG Rrset, and as providing it will raise conflict when the two values are not exact and there is little chance that these value are exact on a given system such that the gap between the two values introduces unnecessary heuristics.

In one or more embodiments, the contentTypes and messageDigest as used herein may be as defined in CMS.

The resulting javascript object notation (JSON) object is:
{'contentType': <content type >,
'messageDigest': <image hash >}

Referring back to the list/steps above:
5. Build the TXT Rrset ("TXT") and insert it in the zone. Eventually multiple VNF images may be added to the zone and the zone file may look as described below, for example:
h_image_base64_0.<rand>.ericsson.net. TXT
  {'contentType': <content type >,
    'messageDigest': <image hash >}
h_image_base64_1.<rand>.ericsson.net. TXT
  {'contentType': <content type >,
    'messageDigest': <image hash >}
h_image_base64_2.<rand>.ericsson.net. TXT
  {'contentType': <content type >,
    'messageDigest': <image hash >}
6. Sign the zone with the ZSK. The signing of the zone may generate a zone in which the ZSK may appear and be signed by the Key Signing Key. The delegation of the zone may be provided by DNSSEC until the Root Zone. In other words, the Root Zone is trusted and the chain of trust is built from this point. The chain of trust does not need to be added as it is in the CMS.

The zone signing operation generates the signatures associated to each TXT Rrset. These Rrsets are represented as described below but other Rrsets associated to DNSSEC are may also be generated, but are not represented for clarity. It includes, for example, the NSEC3 Rrsets as well as other traditional DNS Rrsets such as the NS, A/AAAA Rrsets.

Code portion:
<rand>.ericsson.net. DNSKEY KSK
<rand>.ericsson.net. DNSKEY ZSK
<rand>.ericsson.net. RRSIG <sig>
h_image_base64_0.<rand>.ericsson.net. TXT
  {'contentType': <content type >,
    'messageDigest': <image_hash >}
h_image_base64_0.<rand>.ericsson.net. RRSIG <sig>
h_image_base64_1.<rand>.ericsson.net. TXT
  {'contentType': <content type >,
    'messageDigest': <image hash >}
h_image_base64_1.<rand>.ericsson.net. RRSIG <sig>
h_image_base64_2.<rand>.ericsson.net. TXT
  {'contentType': <content type >,
    'messageDigest': <image hash >}
h_image_base64_2.<rand>.ericsson.net. RRSIG <sig>

In one or more embodiments the hash of the image (object) may be a secure hash function or an unsecure hash function. If a secure hash function is used, the verifier 14 may skip the step of verifying that the hash of the received attributes corresponds to the secure hash of the image (object) since, by construction, the secure-hash corresponds to secure hash (object). However, if an unsecure hash function is used, verifier 14 may perform the verifying step.

Verifier 14

The verification of a given image is performed, by the verifier 14, as follows:
1. Generate the h_image_base64.<rand>.ericsson.net. as described in the step 1-3 in the SIGNER section from the MANIFEST, but steps 1-3 being performed by verifier 14, for example. Note that this also possible to generate it from the VNF itself. As described above, the hash of the image (object), i.e., h_image, may be a secure hash function or an unsecure has function.
2. Perform the DNSSEC validation of h_image_base64.<rand>.ericsson.net. TXT
3. If DNSSEC validation does not succeed, consider the error similarly to an invalid certificate. If a NXDO-MAIN error is returned, consider the VNF as invalid.

If the DNSSEC validation succeeds, read the messageDigest value. In one or more embodiments, a successful DNSSEC resolution occurs by, for example, requesting at least one attribute of the VNF image using the identifier for the VNF image, receiving a response to the request, and validating a response associated with the request. For example, DNSSEC resolver is able to resolve h_image_base64.<rand>.ericsson.net to return attributes (i.e., RDATA). In one or more embodiments, the DNSSEC resolution is unsuccessful if proof of non-existence is received in response to the request, i.e., h_image_base64.<rand>.ericsson.net is not found. For example, the DNSSEC resolver returns a NXDOMAIN for h_image_base64.<rand>.ericsson.net.

In one or more embodiments, if a secure hash function (e.g., algorithm) is used, the verifier 14 may skip the step of verifying that the hash of the received attributes corresponds to the secure hash of the image (object) since, by construction, the secure-hash corresponds to secure hash (object). However, if an unsecure hash function is used, verifier 14 may perform the verifying step. The verifying step, may include determining the hash algorithm and the hash value, and generating the appropriated digest of the VNF image to compare the two values. That is, verifier 14 may perform validation of the VNF image at least in part by determining at least on attribute of the VNF image based at least on the manifest and comparing it to the received at least one attribute of the VNF image that was requested. Attributes may include one or more of hash of object, content type and DNSSEC signature of attributes. If a match occurs, the VNF is considered as verified and may be instantiated. In any other case, the VNF is considered as invalid and must not be instantiated.

CMS Signature Example

The content of a CMS signature is provided below where CMS is based at least on a request for a signature (signature object) as opposed to the disclosure where verifier 14 is requesting attributes of the signature and not the signature itself.

CMS ContentInfo:
  contentType: pkcs7-signedData (1.2.840.113549.1.7.2)
  validity:
    notBefore: May 26 00:00:00 2017 GMT
    notAfter: Jan 18 00:00:00 2038 GMT
  subject: C=SE, O=Ericsson AB, OU=License Center, CN=Root for Signing license files CAX 106 0084/TEST
  key:
    algor:

Some Examples Related to the Features Described Herein

A mechanism that enables a signer 12 is able to leverage DNSSEC to generate signature associated to a container image.

A mechanism that enables a signer 12 and verifier 14 to derive a FQDN as a unique identifier associated to a VNF. The mechanism may take as input the Manifest or the image and/or may require with some previous knowledge.

A mechanism that enables a signer 12 to publish the signatures associated to containers (not provided by CMS).

A mechanism that enables a signer 12 to provide a proof of nonexistence (not provided by CMS).

A mechanism that enable a signer 12 to revoke an VNF before the signature expires.

Example A1. A signer 12, comprising:
processing circuitry 22 and/or a communication interface 20 configured to:
  associate a signature with a virtual network function package, VNFP, the signature being a domain name system security extensions, DNSSEC, based signature for verification of at least one container image in the VNFP; and
  transmit the signature to a verifier 14 system for verification of the VNFP.

Example A2. The signer 12 of Example A1, wherein the processing circuitry 22 and/or a communication interface 20 is further configured to:
  extract a hash algorithm and associated hash value of a VNF image;
  build a fully qualified domain name, FQDN, that uniquely determines the VNF;
  build a signed attribute file; and
  sign a zone with a zone signing key to generate signatures associated with text, TXT, domain name system record set, Rrset.

Example A3. The signer 12 of Example A1, wherein the signature corresponds to a derivable fully qualified domain name, FQDN, that is used as a unique identifier.

Example A4. The signer 12 of any one of Examples A1-A3, wherein the signature is based on a signing a manifest using a private key.

Example B1. A method implemented by a signer 12, the method comprising:
  associating a signature with a virtual network function package, VNFP, the signature being a domain name system security extensions, DNSSEC, based signature for verification of at least one container image in the VNFP; and
  transmitting the signature to a verifier 14 system for verification of the VNFP.

Example B2. The method of Example B 1, further comprising:
  extracting a hash algorithm and associated hash value of a VNF image;
  building a fully qualified domain name, FQDN, that uniquely determines the VNF;
  building a signed attribute file; and
  signing a zone with a zone signing key to generate signatures associated with text, TXT, domain name system record set, Rrset.

Example B3. The method of Example B 1, wherein the signature corresponds to a derivable fully qualified domain name, FQDN, that is used as a unique identifier.

Example B4. The method of any one of Examples B1-B3, wherein the signature is based on a signing a manifest using a private key.

Example C1. A verifier 14, comprising:
processing circuitry 36 and/or a communication interface 34 configured to:
  receive a virtual network function package, VNFP;
  receive a signature associated with the VNFP, the signature being a domain name system security extensions, DNSSEC, based signature; and
  perform verification for a container image in the VNFP based at least in part on the signature.

Example C2. The verifier 14 of Example C1, wherein the verification includes:
  extracting a hash algorithm and associated hash value of a VNF image;
  building a fully qualified domain name, FQDN, that uniquely determines the VNF;
  performing DNSSEC validation of the hash value of the VNF image; and
  if the DNSSEC validation is successful:
    read a first digest value from a message;
    generate a second digest value based on the VNF image; and
    the VNF being verified if the first digest value matches the second digest value.

Example C3. The verifier 14 of Example C1, wherein the signature corresponds to a derivable fully qualified domain name, FQDN, that is used as a unique identifier.

Example C4. The verifier 14 of any one of Examples C1-C3, wherein the signature is based on a manifest being signed using a private key.

Example D1. A method implemented by a verifier 14, the method comprising:
  receiving a virtual network function package, VNFP;
  receiving a signature associated with the VNFP, the signature being a domain name system security extensions, DNSSEC, based signature; and
  performing verification for a container image in the VNFP based at least in part on the signature.

Example D2. The method of Example D1, wherein the verification includes:
  extracting a hash algorithm and associated hash value of a VNF image;
  building a fully qualified domain name, FQDN, that uniquely determines the VNF;
  performing DNSSEC validation of the hash value of the VNF image; and
  if the DNSSEC validation is successful:
    reading a first digest value from a message;
    generating a second digest value based on the VNF image; and
    the VNF being verified if the first digest value matches the second digest value.

Example D3. The method of Example D1, wherein the signature corresponds to a derivable fully qualified domain name, FQDN, that is used as a unique identifier.

Example D4. The method of any one of Examples D1-D3, wherein the signature is based on a manifest being signed using a private key.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A verifier, comprising:
   processing circuitry configured to:
   obtain a hash algorithm and a fully qualified domain name, FQDN, associated with a virtual network function, VNF, image;
   determine an identifier for the VNF image based at least on the hash algorithm and the FQDN;
   perform domain name system security extensions, DNSSEC, resolution of the determined identifier for the VNF image at least in part by requesting at least one attribute of the VNF image using the determined identifier for the VNF image and validating a response associated with the request; and
   perform validation of the VNF image in response to successful DNSSEC resolution.

2. The verifier of claim 1, wherein the DNSSEC resolution is successful based at least on the at least one requested attribute of the VNF image being received and the response associated with the request being validated; and
   the DNSSEC resolution is unsuccessful based at least on a proof of non-existence of the at least one requested attribute of the VNF image being received in response to the request.

3. The verifier of claim 1, wherein the processing circuitry is further configured to receive a manifest including the VNF image; and
   the performing of validation of the VNF image includes:
   determining at least one attribute of the VNF image based at least on the manifest; and
   comparing the determined at least one attribute of the VNF image to the requested at least one attribute of the VNF image.

4. The verifier of claim 1, wherein the at least one attribute includes a content type and a hash of the VNF image.

5. The verifier of claim 1, wherein the processing circuitry is further configured to instantiate the VNF image based at least on successful validation of the VNF image.

6. The verifier of claim 1, wherein the response includes a DNSSEC signature; and
   the processing circuitry configured to validate the DNSSEC signature at least in part by checking a chain of trust up to a root zone.

7. The verifier of claim 1, wherein the obtaining includes receiving a manifest and extracting at least one of the hash algorithm and the FQDN.

8. The verifier of claim 1, wherein the obtaining is based on a pre-configuration of the hash algorithm and the FQDN for performing the DNSSEC resolution and the validation of the VNF image.

9. A signer, comprising:
processing circuitry configured to:
obtain a hash algorithm and a fully qualified domain name, FQDN, associated with a virtual network function, VNF, image;
determine an identifier for the VNF image based at least on the hash algorithm and the FQDN;
determine at least one attribute of the VNF image;
store the identifier for the VNF image and the at least one attribute of the VNF image;
receive a request for at least one attribute of the VNF image for validation, the request being based on the identifier for the VNF image; and
respond to the request for the at least one attribute of the VNF image, the response being part of a domain name system security extensions, DNSSEC, resolution of the identifier of the VNF image.

10. The signer of claim 9, wherein the response includes one of:
the at least one requested attribute of the VNF image; and
an indication of a proof of non-existence of the at least one requested attribute of the VNF image.

11. The signer of claim 9, wherein the storing includes inserting the identifier for the VNF and the at least one attribute of the VNF image in a zone; and
the processing circuitry being further configured to sign the zone with a zone signing key to generate at least one DNSSEC signature, a delegation of the zone being provided by DNSSEC until a root zone, the root zone being a trusted zone from which a chain of trust is built.

12. The signer of claim 11, wherein the response includes the DNSSEC signature.

13. The signer of claim 9, wherein the at least one attribute of the VNF image includes a content type and a hash of the VNF image.

14. The signer of claim 9, wherein the obtaining includes receiving a manifest and extracting at least one of the hash algorithm and the FQDN.

15. The signer of claim 9, wherein the obtaining is based on a pre-configuration of the hash algorithm and the FQDN for performing the DNSSEC resolution and the validation of the VNF image.

16. A method implemented by a verifier, the method comprising:
obtaining a hash algorithm and a fully qualified domain name, FQDN, associated with a virtual network function, VNF, image;
determining an identifier for the VNF image based at least on the hash algorithm and the FQDN;
performing domain name system security extensions, DNSSEC, resolution of the determined identifier for the VNF image at least in part by requesting at least one attribute of the VNF image using the determined identifier for the VNF image and validating a response associated with the request; and
performing validation of the VNF image in response to successful DNSSEC resolution.

17. The method of claim 16, wherein the DNSSEC resolution is successful based at least on the at least one requested attribute of the VNF image being received and the response associated with the request being validated; and
the DNSSEC resolution is unsuccessful based at least on a proof of non-existence of the at least one requested attribute of the VNF image being received in response to the request.

18. The method of claim 16, further comprising receiving a manifest including the VNF image; and
the performing of validation of the VNF image includes:
determining at least one attribute of the VNF image based at least on the manifest; and
comparing the determined at least one attribute of the VNF image to the requested at least one attribute of the VNF image.

19. The method of claim 16, wherein the at least one attribute includes a content type and a hash of the VNF image.

20. The method of claim 16, further comprising instantiating the VNF image based at least on successful validation of the VNF image.

21. The method of claim 16, wherein the response includes a DNSSEC signature; and
the method further comprising validating the DNSSEC signature at least in part by checking a chain of trust up to a root zone.

22. The method of claim 16, wherein the obtaining includes receiving a manifest and extracting at least one of the hash algorithm and the FQDN.

23. The method of claim 16, wherein the obtaining is based on a pre-configuration of the hash algorithm and the FQDN for performing the DNSSEC resolution and the validation of the VNF image.

24. A method implemented by a signer, the method comprising:
obtaining a hash algorithm and a fully qualified domain name, FQDN, associated with a virtual network function, VNF, image;
determining an identifier for the VNF image based at least on the hash algorithm and the FQDN;
determining at least one attribute of the VNF image;
storing the identifier for the VNF image and the at least one attribute of the VNF image;
receiving a request for at least one attribute of the VNF image for validation, the request being based on the identifier for the VNF image; and
responding to the request for the at least one attribute of the VNF image, the response being part of a domain name system security extensions, DNSSEC, resolution of the identifier of the VNF image.

25. The method of claim 24, wherein the response includes one of:
the at least one requested attribute of the VNF image; and
an indication of a proof of non-existence of the at least one requested attribute of the VNF image.

26. The method of claim 24, wherein the storing includes inserting the identifier for the VNF and the at least one attribute of the VNF image in a zone; and
the method further comprising signing the zone with a zone signing key to generate at least one DNSSEC signature, a delegation of the zone being provided by DNSSEC until a root zone, the root zone being a trusted zone from which a chain of trust is built.

27. The method of claim 26, wherein the response includes the DNSSEC signature.

28. The method of claim 24, wherein the at least one attribute of the VNF image includes a content type and a hash of the VNF image.

29. The method of claim 24, wherein the obtaining includes receiving a manifest and extracting at least one of the hash algorithm and the FQDN.

30. The method of claim 24, wherein the obtaining is based on a pre-configuration of the hash algorithm and the FQDN for performing the DNSSEC resolution and the validation of the VNF image.

* * * * *